United States Patent
Pham et al.

(10) Patent No.: US 6,704,161 B1
(45) Date of Patent: Mar. 9, 2004

(54) SHOCK PROTECTION SKIN BUMPER FOR A HARD DISK DRIVE

(75) Inventors: Tho Pham, Milpitas, CA (US); Edward T. Aguilar, San Jose, CA (US); Woo-Sung Kim, Santa Clara, CA (US)

(73) Assignee: Samsung Electronics Co. Ltd. (KR)

( * ) Notice: Subject to any disclaimer, the term of this patent is extended or adjusted under 35 U.S.C. 154(b) by 0 days.

(21) Appl. No.: 09/299,695

(22) Filed: Apr. 26, 1999

Related U.S. Application Data
(60) Provisional application No. 60/107,376, filed on Nov. 6, 1998.

(51) Int. Cl.[7] ................................................ G11B 33/08
(52) U.S. Cl. ........................................................ 360/97.02
(58) Field of Search ........................... 360/97.02, 97.03, 360/97.04

(56) References Cited

U.S. PATENT DOCUMENTS

| | | |
|---|---|---|
| 3,558,831 A | 1/1971 | Prescott et al. .............. 379/436 |
| 4,110,802 A | 8/1978 | Ho et al. .................. 360/265.1 |
| 4,280,156 A | 7/1981 | Villette |
| 4,493,554 A | 1/1985 | Pryor et al. .............. 356/241.1 |
| 4,555,739 A | 11/1985 | Le Van et al. |
| 4,562,500 A | 12/1985 | Bygdnes |
| 4,630,926 A | 12/1986 | Tanaka et al. |
| 4,661,873 A | 4/1987 | Schulze |
| 4,673,996 A | 6/1987 | White |
| 4,703,376 A | 10/1987 | Edwards et al. |
| 4,731,777 A | 3/1988 | Yoshitoshi et al. |
| 4,739,425 A | 4/1988 | Dierkes et al. |
| 4,784,012 A | 11/1988 | Marra |
| 4,794,588 A | 12/1988 | Yoshitoshi et al. |
| 4,802,042 A | 1/1989 | Strom |
| 4,819,105 A | 4/1989 | Edwards |
| 4,839,756 A | 6/1989 | Chew et al. |
| 4,866,553 A | 9/1989 | Kubo et al. |
| 4,870,519 A | 9/1989 | White |
| 4,890,172 A | 12/1989 | Watt et al. |
| 4,949,206 A | 8/1990 | Phillips et al. |
| 4,958,337 A | 9/1990 | Yamanaka et al. |
| 4,982,300 A | 1/1991 | Forbord |
| 5,004,207 A | 4/1991 | Ishikawa et al. |
| 5,021,905 A | 6/1991 | Sleger |
| 5,029,026 A | 7/1991 | Stefansky et al. |
| 5,062,017 A | 10/1991 | Strom et al. |
| 5,097,370 A | 3/1992 | Hsia |

(List continued on next page.)

FOREIGN PATENT DOCUMENTS

| | | | |
|---|---|---|---|
| EP | 0 426 353 A2 | 5/1991 | |
| EP | 0 463 752 A2 | 1/1992 | |
| EP | 0 491 563 A2 | 6/1992 | |
| EP | 0 582 464 A2 | 2/1994 | |
| EP | 0 801 387 A2 | 10/1997 | |
| FR | 2518-791 A | 6/1983 | |
| GB | 2 050 670 | 1/1981 | |
| GB | 2 050 670 A | 1/1981 | |
| GB | 2 100 052 A | 12/1982 | |
| GB | 2 326 755 A | 12/1998 | |
| JP | 632 344 55 | 9/1988 | |
| JP | 3-83281 | * 4/1991 | .............. 360/97.02 |
| JP | 3-104079 | * 5/1991 | .............. 360/97.02 |
| JP | 09251769 A | 9/1997 | |
| JP | 9-293370 | 11/1997 | |
| WO | WO 93/10494 | 5/1993 | |
| WO | WO 96/34390 | 10/1996 | |

OTHER PUBLICATIONS

US 6,091,569, 7/2000, Allsup et al. (withdrawn)

*Primary Examiner*—Jefferson Evans
(74) *Attorney, Agent, or Firm*—Irell & Manella LLP

(57) ABSTRACT

A bumper that can be attached to an outer surface of a hard disk drive housing. The bumper may be constructed from a damping material that attenuates a shock load and dampens a resultant vibratory response of a shock event. The bumper may be snapped onto the disk drive housing without using external fasteners.

4 Claims, 3 Drawing Sheets

U.S. PATENT DOCUMENTS

| | | | |
|---|---|---|---|
| 5,128,822 A | 7/1992 | Chapin et al. | |
| 5,130,870 A | 7/1992 | Jabbari | |
| 5,159,508 A | 10/1992 | Grill et al. | |
| 5,161,900 A | 11/1992 | Bougathou et al. | 384/133 |
| 5,167,167 A | 12/1992 | Tiernan, Jr. et al. | 74/573 R |
| 5,175,661 A | 12/1992 | Mizuno et al. | |
| 5,187,621 A | 2/1993 | Tacklind | 360/97.02 |
| 5,200,868 A | 4/1993 | Chapin et al. | |
| 5,202,803 A | 4/1993 | Albrecht et al. | 360/97.02 |
| 5,214,549 A | 5/1993 | Baker et al. | 360/97.02 |
| 5,216,582 A * | 6/1993 | Russell et al. | 361/395 |
| 5,241,438 A | 8/1993 | Matsushima | |
| 5,243,495 A | 9/1993 | Read et al. | 361/685 |
| 5,247,493 A | 9/1993 | Kime et al. | |
| 5,262,911 A | 11/1993 | Cain et al. | |
| 5,262,913 A | 11/1993 | Stram et al. | |
| 5,267,109 A | 11/1993 | Chapin et al. | 360/236.5 |
| 5,274,519 A | 12/1993 | Saito et al. | 360/254.3 |
| 5,287,235 A | 2/1994 | Cunningham et al. | 360/236.9 |
| 5,293,282 A | 3/1994 | Squires et al. | |
| 5,309,303 A | 5/1994 | Hsia et al. | |
| 5,319,511 A | 6/1994 | Lin | 360/256.1 |
| 5,343,343 A | 8/1994 | Chapin | |
| 5,347,414 A | 9/1994 | Kano | 360/254.4 |
| 5,365,389 A | 11/1994 | Jabbari et al. | |
| 5,369,538 A | 11/1994 | Moe et al. | 360/265.1 |
| 5,396,386 A | 3/1995 | Bolasna et al. | 360/236.1 |
| 5,396,387 A | 3/1995 | Murray | 360/236.8 |
| 5,402,290 A | 3/1995 | Daniel | 360/265.1 |
| 5,404,256 A | 4/1995 | White | 360/236.3 |
| 5,410,402 A | 4/1995 | Li et al. | 356/243.3 |
| 5,422,776 A | 6/1995 | Thorson et al. | 360/98.07 |
| 5,426,562 A | 6/1995 | Morehouse et al. | |
| 5,442,638 A | 8/1995 | Awad et al. | 714/6 |
| 5,455,728 A | 10/1995 | Edwards et al. | 360/256.2 |
| 5,460,017 A | 10/1995 | Taylor | 68/23.2 |
| 5,463,527 A | 10/1995 | Hager et al. | 361/685 |
| 5,469,311 A | 11/1995 | Nishida et al. | 360/97.02 |
| 5,537,272 A | 7/1996 | Kazmierczak et al. | 360/99.08 |
| 5,546,250 A | 8/1996 | Diel | 360/97.02 |
| 5,555,144 A | 9/1996 | Wood et al. | 360/98.08 |
| 5,570,249 A | 10/1996 | Aoyagi et al. | 360/244.2 |
| 5,610,776 A | 3/1997 | Oh | 360/53 |
| 5,636,090 A | 6/1997 | Boigenzahn et al. | 360/256.4 |
| 5,663,853 A | 9/1997 | Park | 360/236.4 |
| 5,673,158 A | 9/1997 | Ichimura | 360/97.01 |
| 5,677,813 A | 10/1997 | Yoshida et al. | 360/97.02 |
| 5,703,734 A | 12/1997 | Berberich et al. | 360/97.02 |
| 5,754,353 A | 5/1998 | Behrens et al. | 360/53 |
| 5,760,998 A * | 6/1998 | Berberich et al. | 360/97.02 |
| 5,768,249 A | 6/1998 | Ro et al. | 360/263 |
| 5,781,373 A | 7/1998 | Larson et al. | 360/97.02 |
| 5,801,899 A | 9/1998 | Genheimer | 360/97.01 |
| 5,815,349 A | 9/1998 | Frater | 360/245.7 |
| 5,822,139 A | 10/1998 | Ayabe | 360/31 |
| 5,831,795 A | 11/1998 | Ma et al. | 360/254.3 |
| 5,844,754 A | 12/1998 | Stefansky et al. | 360/266.1 |
| 5,844,911 A | 12/1998 | Schadegg et al. | 714/710 |
| 5,875,067 A | 2/1999 | Morris et al. | |
| 5,885,005 A | 3/1999 | Nakano et al. | 384/113 |
| 5,886,851 A * | 3/1999 | Yamazaki et al. | 360/97.02 |
| 5,901,017 A | 5/1999 | Sano et al. | 360/245.9 |
| 5,926,347 A | 7/1999 | Kouhei et al. | 360/254.3 |
| 5,930,079 A | 7/1999 | Vera et al. | 360/245.7 |
| 5,930,080 A | 7/1999 | Frater et al. | 360/234.5 |
| 5,936,927 A | 8/1999 | Soga et al. | 369/75.1 |
| 5,969,901 A | 10/1999 | Eckberg et al. | 360/97.01 |
| 5,987,733 A | 11/1999 | Goss | 29/603.03 |
| 6,011,670 A | 1/2000 | Balsley, Jr. et al. | 360/97.01 |
| 6,034,841 A * | 3/2000 | Albrecht et al. | 360/97.01 |
| 6,034,941 A | 3/2000 | Ro | 369/263 |
| 6,046,883 A | 4/2000 | Miller | 360/245.7 |
| 6,055,134 A | 4/2000 | Boutaghou | 360/254.4 |
| 6,084,744 A | 7/2000 | Genheimer et al. | 360/97.02 |
| 6,088,192 A | 7/2000 | Riener et al. | 360/266.1 |
| 6,088,194 A | 7/2000 | Imaino et al. | 360/294.3 |
| 6,088,202 A | 7/2000 | Kabasawa et al. | 360/245.7 |
| 6,091,576 A | 7/2000 | Eckerd et al. | 360/254.8 |
| 6,108,163 A * | 8/2000 | Boutaghou | 360/97.02 |
| 6,115,214 A | 9/2000 | Allsup et al. | 360/254.3 |
| 6,154,360 A | 11/2000 | Kaczeus, Sr. et al. | 361/685 |
| 6,157,522 A | 12/2000 | Murphy et al. | 360/294.6 |
| 6,166,901 A | 12/2000 | Gamble et al. | 361/685 |
| 6,185,075 B1 | 2/2001 | Tsujino et al. | 360/265.7 |
| 6,185,807 B1 | 2/2001 | Kazmierczak et al. | 29/450 |
| 6,201,668 B1 | 3/2001 | Murphy | 360/294.4 |
| 6,205,005 B1 | 3/2001 | Heath | 360/266.1 |
| 6,212,029 B1 | 4/2001 | Fioravanti | 360/97.01 |
| 6,226,143 B1 | 5/2001 | Stefanksy | |
| 6,226,145 B1 | 5/2001 | Genheimer et al. | 360/97.02 |
| 6,226,152 B1 | 5/2001 | Tanaka et al. | 360/244.6 |
| 6,229,668 B1 | 5/2001 | Huynh et al. | 360/97.01 |
| 6,236,531 B1 | 5/2001 | Allsup et al. | 360/97.01 |
| 6,239,943 B1 | 5/2001 | Jennings et al. | 360/97.02 |

\* cited by examiner

SHOCK PROTECTION SKIN BUMPER FOR A HARD DISK DRIVE

CROSS REFERENCE TO RELATED APPLICATIONS

This application claims the benefit of U.S. Provisional Application No. 60/107,376, filed Nov. 6, 1998.

BACKGROUND OF THE INVENTION

1. Field of the Invention

The present invention relates to a bumper for a hard disk drive.

2. Background Information

A hard disk drive contains a plurality of magnetic recording heads that are coupled to a number of rotating disks. The heads can magnetize and sense the magnetic fields of the disks to write and read information as is known in the art. The recording heads are typically gimbal mounted to a corresponding suspension arm. The suspension arms are attached to an actuator arm that is pivotally mounted to a base plate of the drive. The actuator arm may have a voice coil that is coupled to a magnet assembly. The voice coil and magnet assembly are commonly referred to as a voice coil motor ("VCM"). The voice coil is connected to a circuit that can excite the VCM and induce a pivotal movement of the actuator arm. Swinging the actuator arm moves the heads across the surfaces of the disks. Data is typically located within annular tracks on the disk surfaces. Moving the heads provides access to all of the annular tracks.

Each recording head typically has an air bearing surface which cooperates with an air flow generated by the rotating disks to create an air bearing between the head and adjacent disk surface. The air bearing prevents mechanical wear between the head and the disk. The air bearing is very small to maximize the magnetic coupling between the head and the disk surface.

Hard disk drives are typically manufactured by a disk drive manufacturer and then shipped to another entity that assembles the drive into a computer system. The disk drives may be dropped or otherwise exposed to a shock event during shipping and handling. Additionally, the drives may be assembled into computers that are susceptible to shock events. The shock load may provide an impulse force which causes the disk drive to vibrate. The shock and resultant vibratory response may cause the heads to "slap" the disk or induce contact between the suspension arms and the disk surfaces. Head slapping may corrupt the data on the disk or even damage the disk drive components. It would be desirable to provide a disk drive that can dampen the shock load and resultant vibratory response of a shock event.

SUMMARY OF THE INVENTION

One embodiment of the present invention is a bumper that can be attached to an outer surface of a hard disk drive housing.

DETAILED DESCRIPTION

Figure 1:
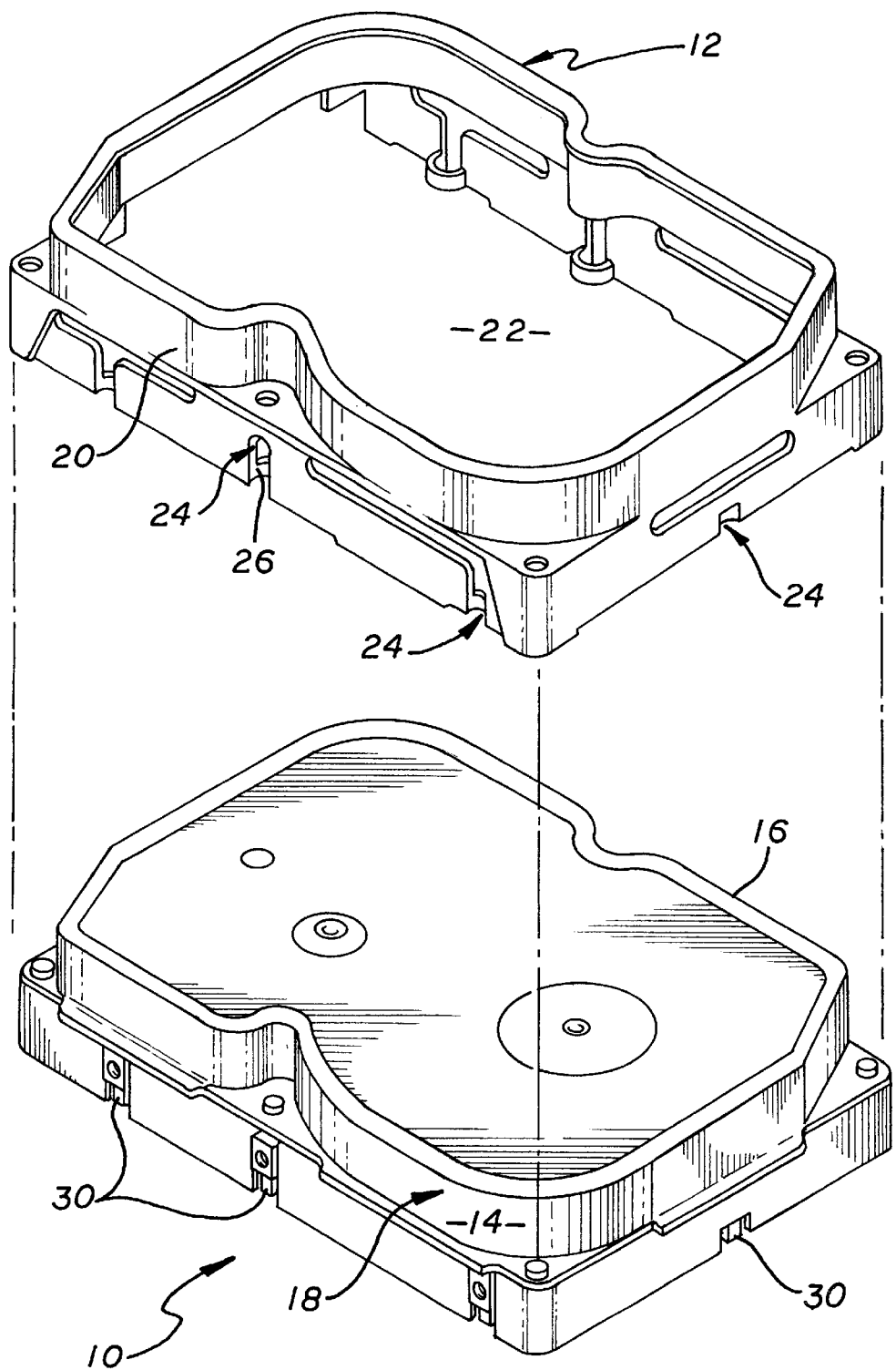
FIG. 1 is an exploded perspective view of an embodiment of a hard disk drive assembly of the present invention.

Referring to the drawings more particularly by reference numbers, FIG. 1 shows an embodiment of a hard disk drive assembly 10 of the present invention. The assembly 10 may include a bumper 12 that is attached to an outer surface 14 of a housing 16 of a hard disk drive 18. The bumper 12 may be constructed from a soft damping material that can absorb shock loads and dampen vibratory energy. By way of example, the bumper 12 may be constructed from a molded polyurethane material.

The bumper 12 may have outer walls 20 that extend about an inner opening 22. The bumper material may be flexible enough so that assembly personnel can stretch the walls 20 to snap the bumper 12 onto the outer housing surface 14. The bumper 12 does not require fasteners to minimize the cost of assembling the disk drive 10. The bumper 12 may have an inner profile that matches the outer profile of the housing 16. The outer walls 20 may cover edges and other surfaces of the disk drive most likely to receive a shock load.

Figure 2:
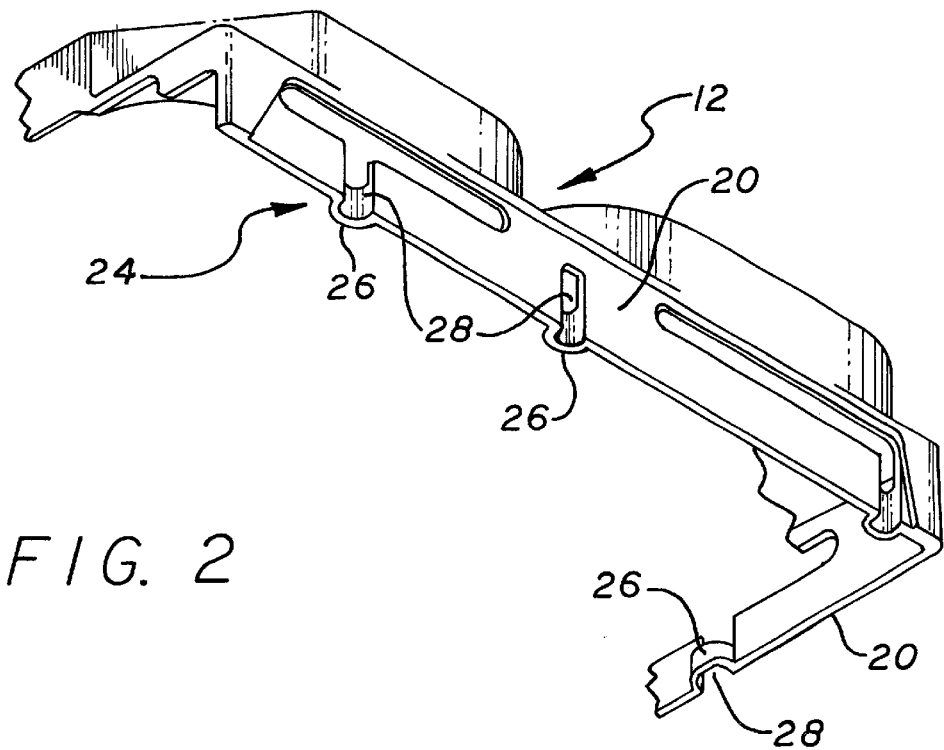
FIG. 2 is a bottom perspective view of a bumper of the hard disk drive assembly.
Figure 3:
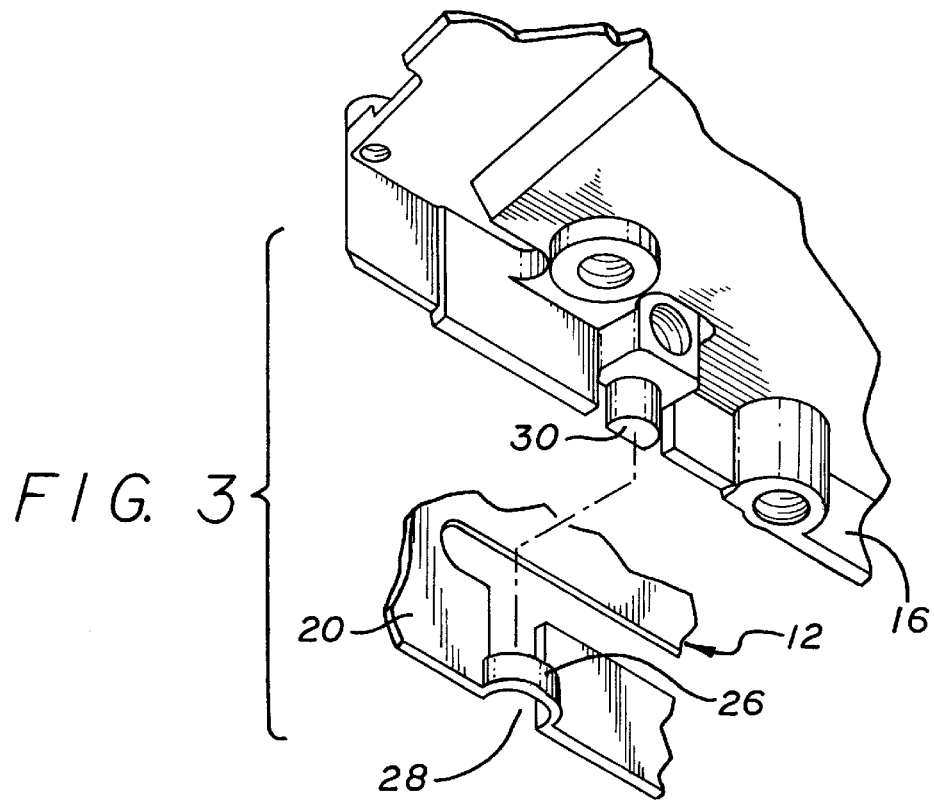
FIG. 3 is an enlarged bottom perspective view showing the bumper being attached to a tab of a disk drive housing.

As shown in FIGS. 2 and 3 the bumper 12 may have a plurality of attachment features 24 that can be snapped onto the housing 16. Each attachment feature 24 may include a radially shaped band 26 which defines a channel 28. A corresponding tab 30 of the disk drive housing 16 can be inserted into the channel 28 to secure the bumper 12 to the housing 16. Although a lip 26 and tab 30 are shown and described, it is to be understood that the attachment features 24 may have other configurations including molded bosses, notches, rails, and grooves, among others. In addition to, or in the alternative, the dimensions of the bumper 12 may be such that the outer walls 20 have an interference fit with the housing 16.

Figure 4:
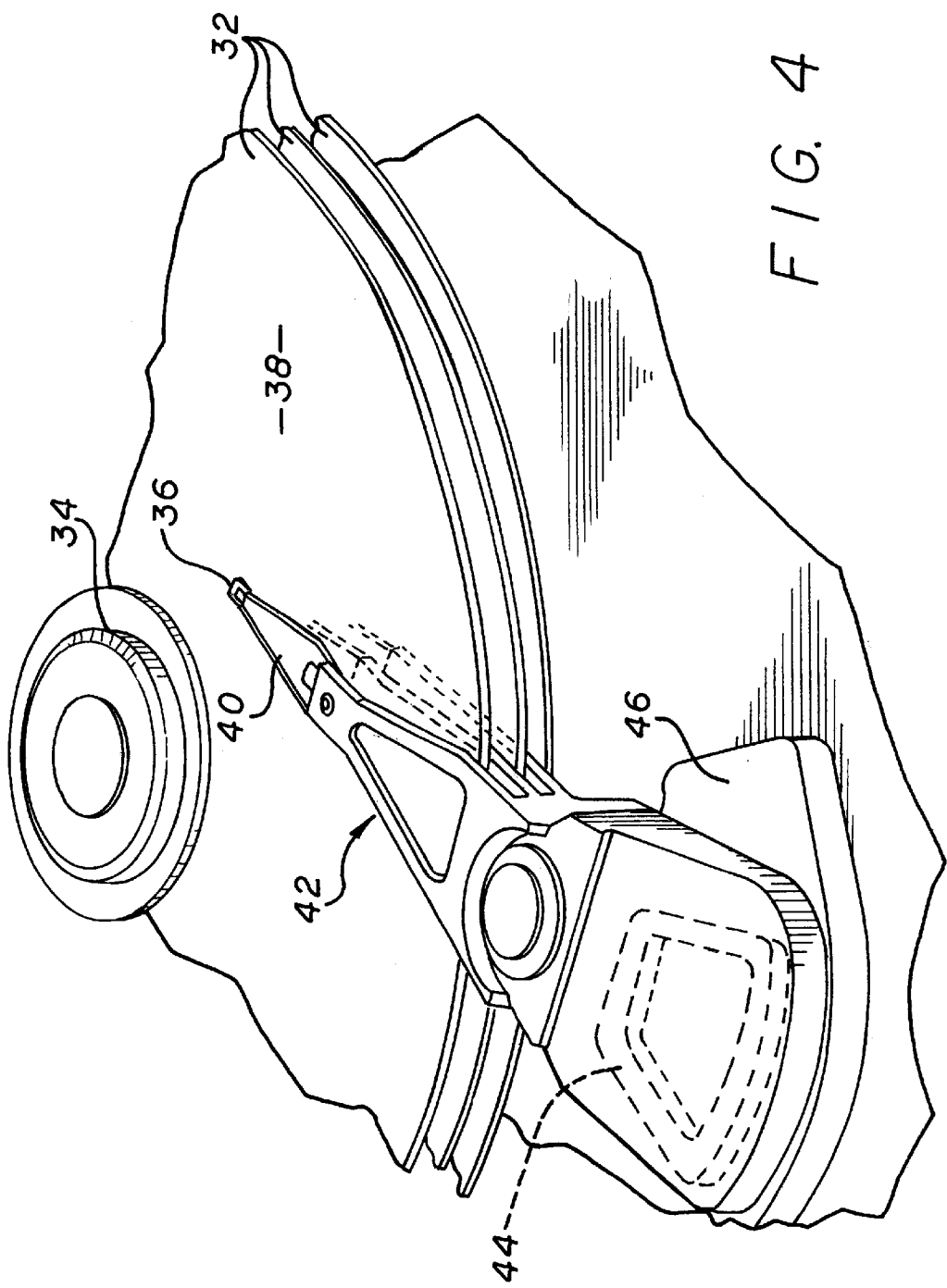
FIG. 4 is a top perspective view showing the internal components of the hard disk drive.

As shown in FIG. 4, the disk drive 18 may include a plurality of disks 32 that are rotated by a spindle motor 34. The spindle motor 34 is mounted to the housing 16. The disks 32 rotate relative to a number of recording heads 36. There is typically a head 36 for each disk surface 38. The heads 36 can magnetize and sense the magnetic fields of the disk surfaces 38 to write and read information as is known in the art.

Each head 36 is typically gimbal mounted to a suspension arm 40 that is attached to an actuator arm 42. The actuator arm 42 may be pivotally mounted to the housing 16. The actuator arm 42 may have a voice coil 44 that is coupled to a magnet assembly 46. The voice coil 44 and magnet assembly 46 may define a voice coil motor that can be excited to swing the actuator arm 42 and move the heads 36 across the disk surfaces 38. Data is typically stored within annular tracks that extend across the disk surfaces 38. Rotating the actuator arm 42 allows the heads 36 to access the different tracks of data.

The disk drive may undergo a shock event which creates an initial shock force and then a resultant vibratory response. The shock event may be caused by someone dropping or bumping into the disk drive assembly 10. The shock force and/or vibratory response may cause the heads 36 to strike the disk surfaces 38. Additionally, the disks 32 may move into the suspension 40 and/or actuator 42 arms. If the shock load is initially applied to a disk drive surface covered by the bumper 12 the bumper material may attenuate the load. Additionally, the damping characteristics of the bumper material may also dampen any resultant vibratory response. The bumper 12 can thus improve the shock and vibration that can be withstood by the disk drive assembly 10, an important characteristic when producing and selling hard disk drives.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for attenuating a shock load and absorbing vibratory energy within a housing of a hard disk drive, comprising:

attaching a bumper to the hard disk drive housing by snapping a tab of the housing into a channel of the bumper to cover a side surface and a portion of a top surface of the hard disk drive housing.

2. A hard disk drive, comprising:

a housing which has an outer surface;

a spindle motor attached to said housing;

a disk that is rotated by said spindle motor;

a head coupled to said disk; and, a bumper attached to said outer surface of said housing, said bumper has an attachment feature that can be snapped onto said outer surface of said housing, said attachment feature includes a band that extends from a wall of said bumper and defines a channel, said channel can receive a corresponding tab of said housing.

3. The hard disk drive of claim 2, wherein said bumper is constructed from a rubber material.

4. The hard disk drive of claim 2, wherein said bumper has an inner surface profile that matches a profile of said housing outer surface.

* * * * *